United States Patent [19]

Grundei

[11]  4,401,196

[45]  Aug. 30, 1983

[54] HYDRAULIC VIBRATION DAMPER WITH NOISE REDUCTION DAMPING VALVES

[75] Inventor: Manfred Grundei, Niederwerrn, Fed. Rep. of Germany

[73] Assignee: Fichtel & Sachs AG, Schweinfurt, Fed. Rep. of Germany

[21] Appl. No.: 256,395

[22] Filed: Apr. 22, 1981

[30] Foreign Application Priority Data

Apr. 23, 1980 [DE] Fed. Rep. of Germany ....... 3015596

[51] Int. Cl.³ .......................... F16F 9/348; F16F 9/34
[52] U.S. Cl. .............................. 188/282; 188/322.14; 188/322.15; 137/513.3
[58] Field of Search .......................... 137/513.5, 513.3; 188/281, 282, 313, 315, 316, 317, 322.13, 322.14, 322.15, 322.22

[56]  References Cited

U.S. PATENT DOCUMENTS

| 2,732,039 | 1/1956 | Funkhouser et al. | 188/282 |
| 3,194,262 | 7/1965 | Hamilton et al. | 137/513.5 X |
| 3,756,357 | 9/1973 | Graff et al. | 188/282 |
| 3,837,445 | 9/1974 | Pierle | 188/322.15 |
| 3,844,389 | 10/1974 | De Carbon | 137/513.3 X |
| 4,034,860 | 7/1977 | Leppich | 188/282 |
| 4,076,276 | 2/1978 | Wijnhoven et al. | 188/322.14 X |
| 4,109,767 | 8/1978 | Nandyal et al. | 188/322.14 X |
| 4,121,704 | 10/1978 | Nicholls | 188/282 |
| 4,203,507 | 5/1980 | Tomita et al. | 188/282 X |

FOREIGN PATENT DOCUMENTS

| 2221944 | 11/1972 | Fed. Rep. of Germany | 188/322.14 |
| 2727407 | 1/1979 | Fed. Rep. of Germany | 188/282 |
| 1546334 | 5/1979 | United Kingdom . | |
| 1549776 | 8/1979 | United Kingdom . | |
| 1561477 | 2/1980 | United Kingdom . | |
| 1568905 | 11/1980 | United Kingdom . | |

*Primary Examiner*—Douglas C. Butler
*Attorney, Agent, or Firm*—Toren, McGeady and Stanger

[57]  ABSTRACT

A hydraulic vibration damper featuring reduced noise characteristics wherein a first and a second damping valve system operate in response to fluid pressure to control flow of damping fluid in each direction of movement, respectively, of a piston of the damper. The first and second damping valve systems include a preliminary throttling aperture, an aperture disc defining a preliminary aperture located downstream relative to the direction of fluid flow through the respective damping valve systems, and a noise reduction mechanism for producing a post-throttling effect downstream of the preliminary aperture, the noise reduction mechanism being formed by a baffle plate located to be impinged by fluid flowing through the preliminary aperture, the baffle plate being arranged to define a quieting duct immediately adjacent the baffle plate upstream thereof.

12 Claims, 3 Drawing Figures

HYDRAULIC VIBRATION DAMPER WITH NOISE REDUCTION DAMPING VALVES

The invention relates to a hydraulic vibration damper having noise reduction damping valves, and more particularly to a vibration damper which includes a working cylinder within which there is arranged an axially movable piston connected with a piston rod which divides the interior of the cylinder into two working spaces. Damping valves are operatively arranged for each direction of movement of the piston and each damping valve system has at least one preliminary throttle as well as a spring-loaded valve plate and a continuously open preliminary outlet cross-section which is formed by a preliminary aperture disc that is provided with at least one opening and is clamped in the region of its inner diameter.

It is known in the prior art, for example from U.S. Pat. No. 3,756,357, to arrange in the preliminary opening phase of a vibration damper, i.e., while the damping valves are closed, a preliminary throttle which is formed by means of bores in a valve plate in order to reduce the flow noise. This valve plate which forms the preliminary throttle is pulled up in the region of the bores and is consequently relatively expensive and difficult to manufacture because an annular space is created by this valve plate between the next valve plate which has the preliminary opening cross-section. The preliminary opening cross-section itself opens on the outlet side into the other working space which has a significantly lower pressure during the corresponding piston movement. Depending on the piston speed, even while the damping valves are in the closed position, in the preliminary opening phase a relatively large pressure differential may prevail between the two working spaces so that the liquid jet which emerges from the preliminary opening cross-section enters a space with limited pressure and thus produces hissing noises. In order to further reduce the noise, it is therefore necessary to connect two of the above-described preliminary opening systems in series. Disadvantages arise in this known design not only because of the complicated manufacturing of the valve plate which forms the preliminary throttle, but also because of the relatively high structural expenditure which results from the connection in series of several of such preliminary opening cross-sections in order to achieve the desired reduction in noise.

It is the task of the present invention to avoid the disadvantages of the known designs and to create a vibration damper of simple construction which guarantees a low-noise damping effect of the preliminary opening cross-sections wherein this design does not affect, or only insignificantly affects, the characteristic curve of attenuation, is thermo-insensitive and makes a simple adaptation to the required damping forces possible.

SUMMARY OF THE INVENTION

In accordance with the present invention, a device which produces post throttling is connected after the preliminary opening cross-section. This device is constructed from a baffle plate, which produces a counterpressure, and an adjoining quieting duct. In this way, the oil jet which emerges from the preliminary opening cross-section does not enter into a space with a lesser pressure, but instead a counterpressure, albeit slight, is built up due to the impact on the baffle plate and this counterpressure is then again balanced out in the quieting duct and thus a quieting of the liquid flow is guaranteed before the flow enters the space with a lower pressure.

The baffle plate and the quieting duct thus act in a simple way as post throttle means for the damping liquid which flows out of the preliminary outlet cross-section. The effect of this post throttling therefore corresponds essentially to a pressure increase on the outlet side whereby hissing of the liquid jets is prevented or can be adjusted to significantly higher damping speeds. The thermo-sensitivity can be significantly reduced in such a design because the preliminary outlet cross-section is formed by very short ducts. The arrangement of the baffle plate also results in that the impact pressure thus produced increases with the increasing oil jet velocity and consequently even at very high oil jet velocities, an extremely effective reduction in noise is achieved.

According to a feature of the invention, the baffle plate is arranged at a small distance from the orifice of the passage opening. This distance, as shown in a feature of the invention, is formed by means of a spacing ring and is approximately 0.1 mm.

An especially simple embodiment of baffle plate and spacing ring is obtained according to the invention in that the spacing ring is constructed in one piece with a valve plate and forms the valve seat. A very simple construction of the damping device is also achieved with the feature that the baffle plate forms the boundary surface for the quieting duct.

In the piston valve which serves for tension damping of the vibration damper, a low-noise preliminary outlet is created in an especially advantageous manner in that the preliminary aperture disc lies in the closed state of the valve in the region of its outer diameter on the one side on the valve seat of the piston and on the other side on the spacing ring of the valve plate. Also, it has at least one opening which is arranged between the valve seat and the clamping point. The quieting duct is limited by the baffle plate and the preliminary aperture disc and is directed radially inwardly and opens into a duct section which extends in the axial direction and is limited by the surface of the valve plate, which is formed by the inner diameter, and a guide ring. The preliminary aperture disc is attached in a simple manner by being clamped according to the invention between the end face of the piston and that of the guide ring.

In order to limit the stress on the preliminary aperture disc when the damping valve is open, the former is created by a disc which is essentially flat when the damping valve is closed which has the advantage that the clamping point at the piston lies in the same plane of cross-section as the valve seat. However, the preliminary aperture disc can easily be prestressed in the direction of valve opening so that it is pressed by the valve plate against its initial stress against the valve seat of the piston when the valve is closed.

A significant reduction of the operating noise in the preliminary opening region in a bottom valve of a dual-tube vibration damper, assigned to compression strokes, is accomplished in that according to the invention in the region of the damping valve a covering cap which encloses the valve is arranged which on the one side surrounds the valve body with the cylindrical inner wall, and which on the other side clamps the valve system with a projection which is arranged at the inner diameter. The cap bottom is provided with openings whose orifices are arranged at a small distance from a baffle plate and this baffle plate forms together with the bottom surface of the covering cap the quieting duct which is arranged to extend radially outwardly. In order to guarantee perfect functioning during a high liquid throughput through the valve system, i.e., when the pressure valve is open, the baffle plate is constructed according to the invention as a cup spring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFEFRRED EMBODIMENTS

Figure 1:
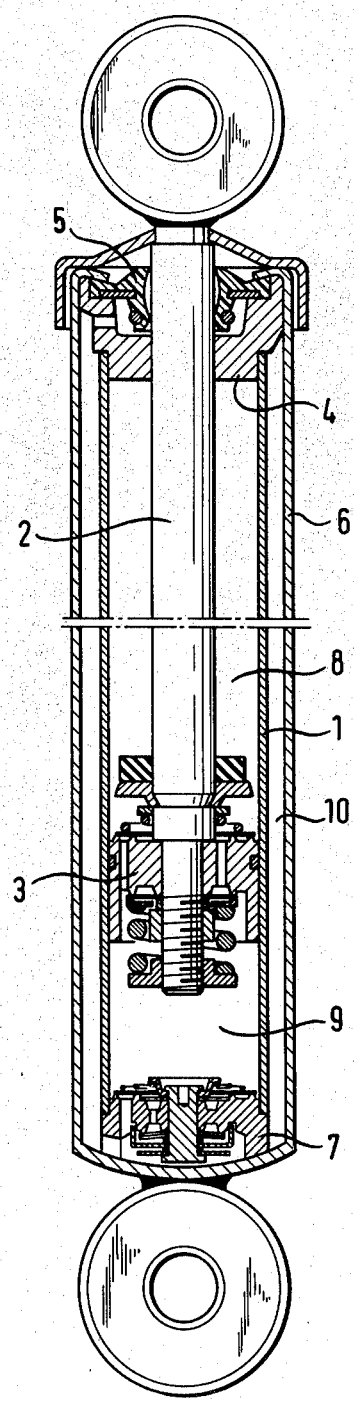
FIG. 1 is a longitudinal section of a dual-tube vibration damper.

The hydraulic vibration damper shown in FIG. 1 is intended for installation in motor vehicles and is arranged in a customary manner between the vehicle axle and the vehicle body. The vibration damper is of a dual-tube construction and is comprised essentially of the cylinder 1 in which there is slidably arranged a piston 3 connected with a piston rod 2. The cylinder 1 is centered in a tubular container 6 by means of a piston rod guide member 4 and a bottom valve member 7.

The piston rod guide member 4 serves for central guidance of the piston rod 2, and a piston rod seal 5 seals the interior of the vibration damper from the exterior thereof. The interior of the cylinder 1 is divided by the piston 3 into a working space 8 above the piston and a working space 9 below the piston. The working space 9 is connected by means of the bottom valve member 7 with an equalizing space 10 which is arranged between the cylinder 1 and the tubular container 6.

The working spaces 8 and 9 are filled with damping liquid, while the equalizing space 10 is only partially filled with damping liquid and has a gas filling in the upper region thereof.

Figure 2:
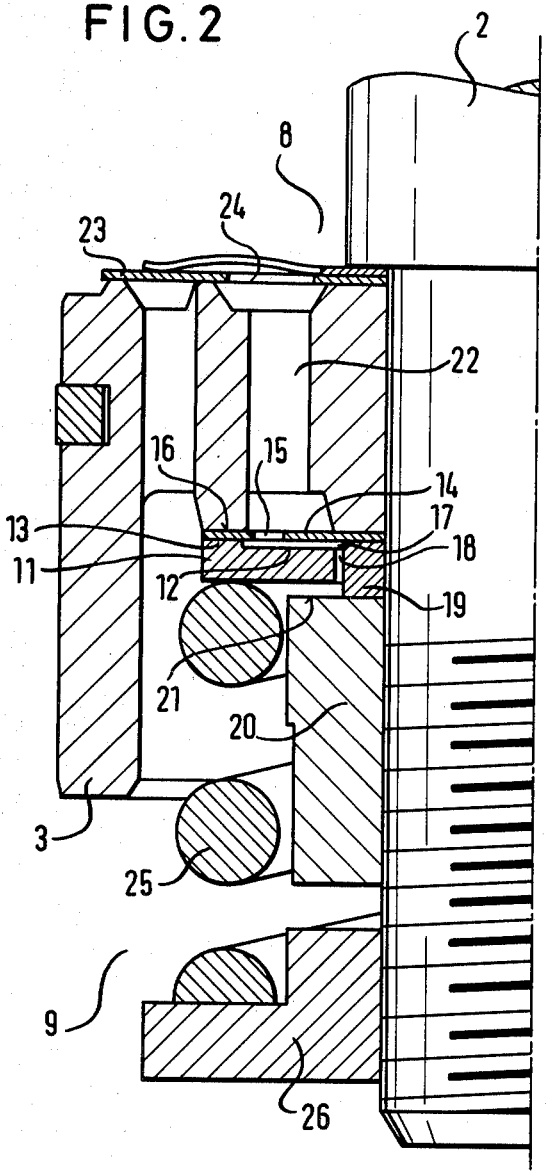
FIG. 2 is a longitudinal section through the piston of this vibration damper, shown in an enlarged scale.

FIG. 2 shows in greater detail the piston 3 of the vibration damper which is firmly connected with the piston rod 2 by means of a retaining nut 20. A damping valve which is assigned to the tension stroke, i.e., the outward movement of the piston rod 2 from the cylinder 1, is comprised of a valve plate 11 which has a baffle plate 12 as well as a spacing ring 13. A preliminary aperture disc 14 provided with a preliminary aperture 15 is pressed at its inner diameter by a guide ring 19 against the piston body and is thus firmly clamped. When the tension valve is closed, this preliminary aperture disc 14 comes in contact in the region of its outer diameter on one side with a valve seat 16 of the piston 3, and on the other side with the spacing ring 13 of the valve plate 11.

The piston 3 has piston bores 22 for flow connection of the working space 8 with the working space 9 in the tension phase. The valve plate 11 is pressed against the preliminary aperture disc 14 by means of a valve spring 25, wherein the initial stress of this valve spring 25 can be changed by means of the adjusting nut 26. The spacing ring 13 of the valve plate 11 determines the axial distance in the region of the preliminary aperture 15 between the preliminary aperture disc 14 and the baffle plate 12. When the preliminary aperture disc 14 is of a flat construction, then this axial distance represents at the same time the height of the quieting duct 17.

The quieting duct 17 opens into a duct section 18 which is defined by a surface formed on the inner diameter of the valve plate 11 and the guide ring 19. For centering of the valve plate 11, the guide ring 19 is provided with guide cams which rest on the cylindrical inner surface of the valve plate 11.

A check valve 23 which is assigned to the compression stroke interacts with the corresponding piston passages and may form simultaneously a preliminary throttle aperture 24 for the tension valve.

Figure 3:
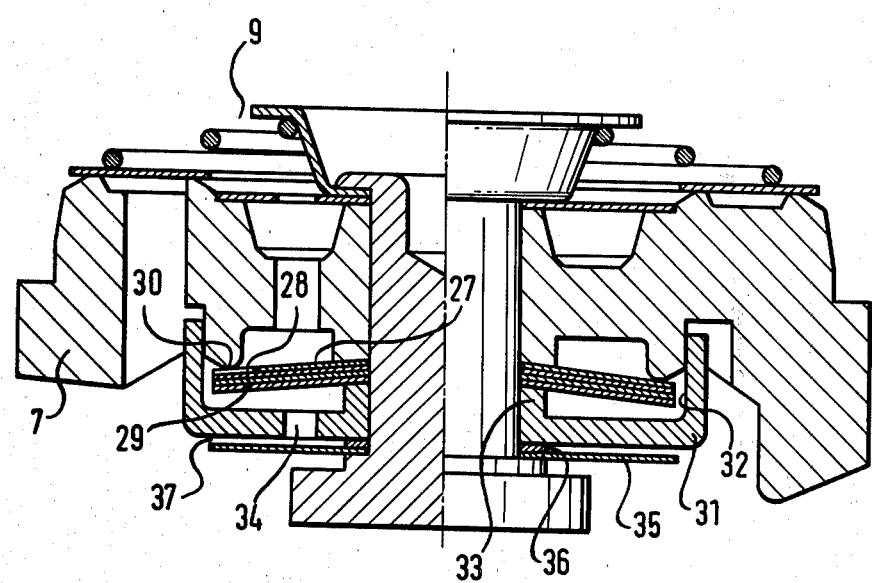
FIG. 3 shows an enlargement of the bottom valve in longitudinal section.

FIG. 3 shows on an enlarged scale the bottom valve member 7 shown in FIG. 1, wherein a check valve which opens in the tension phase is provided which is acted upon by a helical spring of conical construction. The damping valve which is effective during the compression phase, i.e., during the inward movement of the piston rod into the cylinder, consists of a preliminary aperture disc 27 having a preliminary aperture 28 formed by one or more small cutouts in the region of the valve seat 30. The preliminary aperture disc 27 is pressed against the valve seat 30 by a cup spring unit 29, so that in the closed state of the valve, only the preliminary aperture 28 is effective. A covering cap 31 lies with a cylindrical inner wall 32 on a projection which is located in the region of the valve seat 30 and surrounds the pressure valve. This covering cap 31 has openings 34 which are constructed as bores for the flow of the damping liquid. A spacing ring 36 enables the baffle plate 35, which is constructed as a cup spring, to be clamped so as to be located at a small distance from the orifice of the openings 34. The openings 34 are arranged in the bottom of the covering cap 31 in such a way that a quieting duct 37 is formed between the bottom surface and the baffle plate 35.

In the tension phase of the operation of the vibration damper shown in FIGS. 1 to 3, i.e., during the outward movement of the piston rod 2 from the cylinder 1, the piston 3 moves upwardly. Thus, pressure increases in the working space 8, while a lesser pressure prevails in the working space 9. As a result of the pressure differential, damping liquid flows through the damping valve in the piston 3 which is assigned to tension damping. This flow occurs through the preliminary throttle aperture 24, the bores 22 and the preliminary aperture 15 of the preliminary aperture disc 14 whereby the damping liquid strikes the baffle plate 12. This produces an impact pressure which increases with increasing oil jet velocity, and an immediate pressure equalization of the oil jets which pass through does not result. The damping liquid now flows through the quieting duct 17 and the duct section 18 into the working space 9.

Due to this post-throttling effect of the damping liquid which flows through the preliminary aperture 15, fast pressure reduction and noise formation are prevented. The check valve 23 of the piston remains closed, but through the check valve which is located in the bottom valve member 7, there is drawn from the equalizing space 10 into the working space 9 an amount of liquid which corresponds to the volume of the outwardly moving piston rod. Due to the diaphragm-like opening cross-section 15 of the preliminary aperture disc 14 a thermo-insensitivity regarding the characteristic curve of the damping force is achieved.

When the force exerted on the valve plate 11 due to the pressure differential between the working spaces 8 and 9 is large enough to overcome the force of the valve spring 25, the valve plate 11 opens and the damping valve which acts in dependence on pressure releases an appropriate flow passage. The damping liquid then flows through the piston bores 22 and the passage which is released by the preliminary aperture disc 14 and the valve seat 16 into the working space 9.

During the compression stroke, i.e., during inward movement of the piston rod 2 into the cylinder 1, the check valve 23 opens so that the damping liquid overflows from the working space 9 into the working space 8. The check valve in the bottom valve member 7 remains closed and an amount of liquid corresponding to the inwardly moving piston rod volume is displaced through the pressure valve which is located in the bottom valve member from the working space 9 into the equalizing space 10. Due to the pressure differential between the working space 9 and the equalizing space 10, the damping liquid flows through the preliminary aperture 28 of the preliminary aperture disc 27 and from there through the openings 34 of the covering cap 31 towards the baffle plate 35 and subsequently through the quieting duct 37 into the equalizing space 10. Only when an appropriate high pressure builds up in the working space 9 due to the high inward speed of the piston rod, does the preliminary aperture disc 27 lift against the force of the cup spring unit 29 from the valve seat 30. This results in a higher stream of damping liquid which also flows through the openings 34 of the covering cap 31 and consequently the baffle plate 35, which is constructed as a plate spring, bends accordingly so that the cross-section of the quieting duct 37 is increased.

While specific embodiments of the invention have been shown and described in detail to illustrate the application of the inventive principles, it will be understood that the invention may be embodied otherwise without departing from such principles.

What is claimed is:

1. A hydraulic vibration damper unit comprising
  (A) a cylinder member (1) having an axis and two ends defining a cavity (8, 9) therein; said cavity containing a fluid;
  (B) a piston rod member (2) passing through one of said ends along said axis and being movable in an inward and an outward direction along said axis;
  (C) a piston unit fixed to said piston rod member (2) within said cavity (8, 9) and dividing said cavity (8, 9) into two working chambers (8, 9) consisting of a first working chamber (8) adjacent one of said ends of said cylinder member (1) and a second working chamber (9) adjacent the other of said ends of said cylinder member (1), said piston unit comprising
    (a) a piston member (3);
    (b) first passage means between said working chambers (8, 9);
    (c) second passage means (22, 15, 17, 18) between said working chambers (8, 9), said second passage means (22, 15, 17, 18) including at least one substantially axially directed bore (22) through said piston member (3), said bore (22) having a first end adjacent said one end of said cylinder member (1) and a second end remote from said one end of said cylinder member (1);
  (d) check valve means operatively associated with said second passage means (22, 15, 17, 18) and increasingly opening said second passage means in response to outward movement of said piston unit, said check valve means comprising
    ($d_1$) an annular valve seat (16) on said piston member (3) radially outwardly of said second end of said bore (22);
    ($d_2$) an annular disc member (14) substantially perpendicular to said axis substantially covering said second end of said bore (22), said annular disc member (14) being axially fixed with respect to said piston member (3) radially inwardly of said second end of said bore (22) and being yieldingly biased into contact with said annular valve seat (16), said annular disc member (14) being provided with at least one opening (15);
    ($d_3$) an annular plate member (11) substantially perpendicular to said axis adjacent said annular disc member (14) on the side thereof remote from said annular valve seat (16), said annular plate member (11) being provided with an axial projection (13) engaging said annular disc member (14) along a circle substantially following said annular valve seat (16) and with an annular recess (17) radially inward of said annular projection (13), said annular recess (17) having a bottom face (12) spaced from said annular disc member (14) and being opposed to said opening (15), at least one substantially axially directed channel (18) being provided between said annular recess (17) and said second working chamber (9) at a location radially inward of said opening (15), said annular plate member (11) being axially movable and urged into a closing position by spring means (25) urging said projection (13) into contact with said annular disc member (14), said annular disc member (14) and said annular plate member (11) being movable away from said annular valve seat (16) by deflection of said annular disc member (14) and axial movement of said annular plate member (11) in response to increase of fluid pressure in said first working chamber (8) above the level of fluid pressure in said second working chamber (9) by a predetermined amount.

2. A hydraulic vibration damper unit according to claim 1 wherein said substantially axially directed channel (18) is connected to said second working chamber (9) by a radially inwardly directed channel (21).

3. A hydraulic vibration damper unit according to claim 1 wherein said spring means comprise a helical compression spring (25).

4. A hydraulic vibration damper unit according to claim 1 wherein said substantially axially directed channel (18) is defined between the radially inner edge of said annular plate member (11) and a plate member guiding member (19), said annular disc member (14) being fixed between axially opposed fixing faces of said piston member (3) and said plate member guiding member (19), said plate member guiding member (19) being pressed against said annular disc member (14) by a fixing member (20) fixed to said piston rod member (2) and holding said piston member (3) in engagement with an abutment face of said piston rod member (2) through said plate member guiding member (19) and said annular disc (14).

5. A hydraulic vibration damper unit according to claim 4 wherein said fixing member (20) defines an abutment for the axial movement of said plate member (11) in a direction away from said annular valve seat (16).

6. A hydraulic vibration damper unit according to claim 1 comprising further check valve means associated with said first passage means opening said first passage means in response to inward movement of said piston unit when the fluid pressure in said second working chamber (9) is increased above the level of fluid pressure in said first working chamber (8) by a predetermined amount.

7. A hydraulic vibration damper unit according to claim 6 wherein said further check valve means (23) comprise a further valve disc (23), said further valve disc also covering said first end of said axial bore (22) and being provided with an opening (24) in communication with said axial bore (22).

8. A hydraulic vibration damper unit according to claim 1 wherein the axial distance between said bottom face (12) and said disc member (14) is about 0.1 mm.

9. A fluid separating unit arranged between two fluid-filled working chambers (8, 9) consisting of a first working chamber (8) and a second working chamber (9) comprising
(a) a separating member (3) having an axis;
(b) first passage means between said working chambers (8, 9);
(c) second passage means (22, 15, 17, 18) between said working chambers (8, 9), said second passage means (22, 15, 17, 18) including at least one substantially axially directed bore (22) through said separating member (3), said bore (22) having a first end adjacent said first working chamber (8) and a second end adjacent said second working chamber (9);
(d) check valve means operatively associated with said second passage means (22, 15, 17, 18) and increasingly opening said second passage means in response to increase of fluid pressure in said first working chamber (8) as compared with the fluid pressure in said second working chamber (9), said check valve means comprising
  ($d_1$) an annular valve seat (16) on said separating member (3) radially outward of said second end of said bore (22);
  ($d_2$) a disc member (14) substantially perpendicular to said axis substantially covering said second end of said bore (22), said disc member (14) being axially fixed with respect to said separating member (3) radially inward of said second end of said bore (22) and being yieldingly biased into contact with said annular valve seat (16), said disc member (14) being provided with at least one opening (15);
  ($d_3$) a plate member (1) substantially perpendicular to said axis adjacent the disc member (14) on the side thereof remote from said annular valve seat (16), said plate member (11) being provided with an axial projection (13) engaging said disc member (14) along a circle substantially following said annular valve seat (16) and with a recess (17) radially inward of said annular projection (13), said recess (17) having a bottom face (12) spaced from said disc member (14) and being opposed to said opening (15), at least one substantially axially directed channel (18) being provided between said recess (17) and said second working chamber (9) at a location radially inward of said opening (15), said plate member (11) being axially movable and urged into a closing position by spring means (25) urging said projection (13) into contact with said disc member (14), said disc member (14) and said plate member (11) being movable away from said annular valve seat (16) by deflection of said disc member (14) and axial movement of said plate member (11) in response to increase of fluid pressure in said first working chamber (8) above the level of fluid pressure in said second working chamber (9) by a predetermined amount.

10. A hydraulic vibration damper unit comprising
(A) a cylinder member (1) having an axis and two ends and defining a cavity (8, 9) therein, said cavity containing a fluid;
(B) a piston rod member (2) passing through one of said ends along said axis and being movable in an inward and an outward direction along said axis;
(C) a piston unit fixed to said piston rod member (2) within said cavity (8, 9) and dividing said cavity (8, 9) into two working chambers (8, 9) consisting of a first working chamber (8) adjacent one of said ends of said cylinder member (1) and a second working chamber (9) adjacent the other of said ends of said cylinder member (1), said piston unit comprising passage means between said working chambers (8, 9) and valve means associatd with said passage means;
(D) a container member (6) surrounding said cylinder member (1) and defining an annular space (10) between said cylinder member (1) and said container member (6);
(E) separating unit adjacent said other end of said cylinder member (1), said separating unit comprising
  (a) a separating member (7) having an axis;
  (b) first flow path means between said second working chamber (9) and said annular space (10);
  (c) first check valve means associated with said first flow path means, said check valve means opening said first flow path means in response to increase of pressure within said annular space to a level above the fluid pressure in said second working chamber (9) by a predetermined amount;
  (d) second flow path means between said second working chamber (9) and said annular space (10), said second flow path means comprising at least one substantially axially directed bore through said separating member (7) having a first end adjacent said second working chamber (9) and a second end adjacent said annular space; and
  (e) second check valve means (27, 29) associated with said second flow path means, said second check valve means comprising
    ($e_1$) an annular valve seat (30) radially outward of said second end of said bore;
    ($e_2$) at least one annular disc member (27, 29) substantially perpendicular to said axis and being fixed with respect to said separating member (7) adjacent said axis and being biased into contact with said annular seat (30) by its radially outer portion, said radially outer portion being movable from said annular valve seat (30) in response to increase of pressure within said second working chamber (9) to a level above the pressure within said annular space (10) by a predetermined amount;
- ($e_3$) a slot (28) in said at least one annular disc member (27, 29) across said valve seat (30);
- ($e_4$) a cage member (31) fixed to said separating member (7) and defining a chamber accommodating said annular disc member (27, 29) radially outward thereof and on its side remote from said annular valve seat (30);
- ($e_5$) a substantially axially directed opening (34) in said cage member at a location radially inward of the radially outer end of said annular disc member (27, 29); and
- ($e_6$) a baffle member (35) fixed with respect to said separating member (7) axially opposed to said opening (34) outside said chamber, a cap (37) being defined between said cage member (31) and said baffle member (35), said gap (37) being open to said annular space (10) at a location radially outward of said opening (34).

11. A hydraulic vibration damper unit according to claim 10 wherein the axial width of said gap (37) is about 0.1 mm.

12. A separating unit arranged between a first fluid chamber (9) and a second fluid chamber (10), said separating unit comprising
- (a) a separating member (7) having an axis;
- (b) first flow path means between said first fluid chamber (9) and said second fluid chamber (10);
- (c) first check valve means associated with said first flow path means, said check valve means opening said first flow path means in response to increase of pressure within said second fluid chamber (10) to a level above the fluid pressure in said first fluid chamber (9) by a predetermined amount;
- (d) second flow path means between said first fluid chamber (9) and said second fluid chamber (10), said second flow path means comprising at least one substantially axially directed bore through said separating member (7) having a first end adjacent said first fluid chamber (9) and a second end adjacent said second fluid chamber (10);
- (e) second check valve means (27, 29) associated with said second flow path means, said second check valve means comprising
  - ($e_1$) an annular valve seat (30) radially outward of said second end of said bore;
  - ($e_2$) at least one annular disc member (27, 29) substantially perpendicular to said axis and being fixed with respect to said separating member (7) adjacent said axis and being biased into contact with said annular seat (30) at its radially outer portion, said radially outer portion being movable from said annular valve seat (30) in response to increase of pressure within said first fluid chamber (9) above the pressure within said second fluid chamber (10) by a predetermined amount;
  - ($e_3$) a slot (28) in said at least one annular disc member (27, 29) across said valve seat (30);
  - ($e_4$) a cage member (31) fixed to said separating member (7) and defining a chamber accommodating said annular disc member (27, 29) radially outward thereof and on its side remote from said annular valve seat (30);
  - ($e_5$) a substantially axially directed opening (34) in said cage member at a location radially inward of said radially outer edge of said annular disc member (27, 29);
  - ($e_6$) a baffle member (35) fixed with respect to said separating member (7) axially opposed to said opening (34) outside said diameter, a gap (37) being defined between said cage member (31) and said baffle member (35), said gap being open to said second fluid chamber (10) at a location radially outward of said opening (34).

* * * * *